J. L. HIEGEL.
COUPLING.
APPLICATION FILED JULY 10, 1919.

1,359,989.

Patented Nov. 23, 1920.

Inventor
Joseph L. Hiegel
By Rector, Hibben, Davis & Macauley
His Attorneys.

UNITED STATES PATENT OFFICE.

JOSEPH L. HIEGEL, OF DALLAS, TEXAS, ASSIGNOR TO H. W. CALDWELL & SON COMPANY, OF CHICAGO, ILLINOIS, A CORPORATION OF ILLINOIS.

COUPLING.

1,359,989.  Specification of Letters Patent.  Patented Nov. 23, 1920.

Application filed July 10, 1919. Serial No. 309,954.

*To all whom it may concern:*

Be it known that I, JOSEPH L. HIEGEL, a citizen of the United States, residing at Dallas, in the county of Dallas and State of Texas, have invented certain new and useful Improvements in Couplings, of which the following is a specification.

My invention relates to means for coupling together hollow pipes, and more particularly is designed for uniting sections of helicoid conveyers which have a spiral blade secured to an axial hollow shaft by means of which it is rotated. In practice such conveyers are made up in sections of standard lengths, and in installations of such conveyer apparatus it is common practice to couple one or more sections together according to the requirements of the work to be done by means of a coupling pin arranged in the proximate ends of adjacent sections and secured to the sections by cross bolts. It has been found that the strains and vibration to which the conveyers are subject rapidly cause the bolts to loosen and the bolt holes to become elongated, thereby impairing the security of the connection and sometimes rendering a valuable section of a conveyer useless. The loose bolts, moreover, sometimes cut or wear in two, and the parts find their way into other parts of the apparatus, thereby causing serious damage. It is the object of my invention to overcome such defects and objections in couplings heretofore used, and my invention consists in the specific construction and arrangement of the coupling members hereinafter described, and illustrated in the accompanying drawing forming part of this application, the essential elements of the invention being more particularly pointed out in the appended claims.

Figure 1:
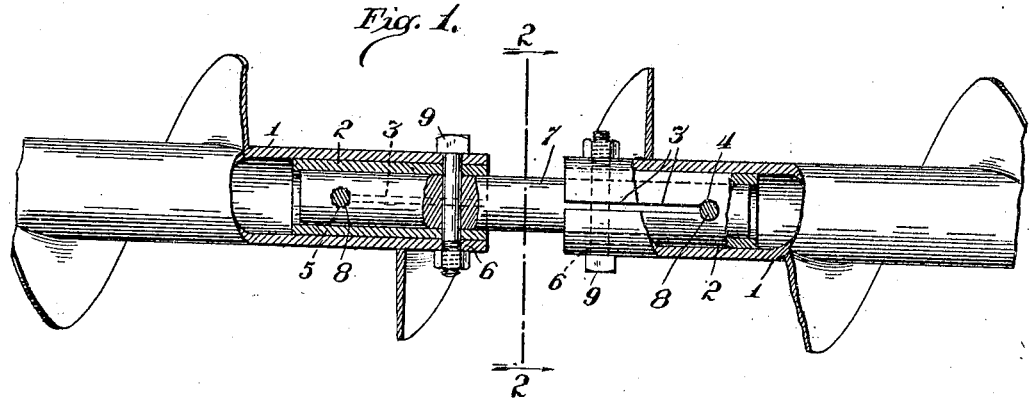
Figure 2:
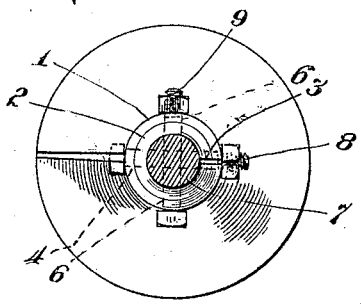
Figure 3:
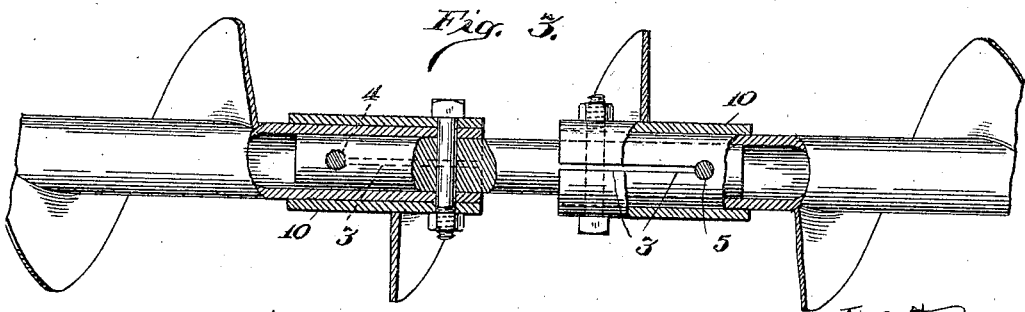

In the drawing Figure 1 is a diametrical section of the end of one conveyer section and coupling pin, the proximate end of the adjacent section being shown partly in section and partly in elevation; Fig. 2 is a cross-section on the line 2—2 of Fig. 1; and Fig. 3 is a fragmentary portion of a modified form of coupling.

The same reference characters indicate the same parts in all the figures of the drawing.

The hollow shafts 1 of the conveyer sections to be coupled are in the present instance, and preferably, each provided with an internal bushing 2 adjacent the proximate ends. The shaft and bushing of each section are longitudinally slitted back from the end of the shaft a suitable distance—say, for example, four or five inches in the case of a shaft to inches in diameter,—the inner end of the narrow slit 3 so formed terminating in a bolt hole 4 arranged diametrically opposite a second bolt hole 5 formed in the shaft and bushing. Near the extremity of the shaft and bushing such members are formed with diametrically opposite bolt holes 6, the axis of which lies at right angles to the axis of the bolt holes 4 and 5. The coupling pin 7 is formed with two pairs of bolt holes adapted to register with the bolt holes in the shafts and bushings of two conveyer sections to be coupled together, and the parts tightly clamped together by clamping bolts 8 engaging the holes 4 and 5 and the registering hole through the pin, and similar bolts 9 engaging the holes 6 and the registering hole through the pin.

The slitting of the ends of the shaft and bushing and the described arrangement of the bolts with respect to the slit have in practice been found effective in eliminating the defects in conveyer couplings before mentioned, and provide an absolutely tight and secure coupling. The slits enable the bolts 9 to close the sockets at the end of the shafts of the conveyer sections firmly on the pin, and the resiliency or expansive action of the slitted end portions of the shaft outwardly against the bolt heads and nuts prevents the latter from becoming loose.

The modification shown in Fig. 3 differs from that above described in that the end of the conveyer shaft is reinforced with a collar 10 instead of the bushing 2 of the first form. While in practice either a bushing or a collar is desirable and employed, it is obvious that if desired they could both be omitted.

I claim:

1. A coupling for conveyer sections and the like comprising a hollow shaft for each section longitudinally slitted at its end and arranged to permit circumferential expansion and contraction adjacent the slit, a coupling pin arranged within said slitted shaft ends, said pin and each shaft end being formed with registering bolt holes near the extremity of the shaft arranged on an axis extending at right angles to the diametrical plane of the slit, and clamping bolts engaging said bolt holes and arranged to contract the slitted shaft ends.

2. A coupling for conveyer sections and the like comprising a hollow shaft for each section longitudinally slitted at its end and arranged to permit circumferential expansion and contraction adjacent the slit, a coupling pin arranged within said slitted shaft ends, said pin and each shaft end being formed with registering bolt holes near the extremity of the shaft arranged on an axis extending at right angles to the diametrical plane of the slit, and also formed with bolt holes extending diametrically through said pin and shaft at a point adjacent the end of said slit, and clamping bolts engaging said bolt holes and arranged to contract the slitted shaft ends.

3. A coupling according to claim 2 in which the bolt near the extremity of a shaft extends in a direction at right angles to the bolt adjacent the end of the slit in such shaft.

4. A coupling according to claim 1 in which said shaft is equipped with a concentric reinforcing member slitted and orificed in registration therewith.

JOSEPH L. HIEGEL.